United States Patent [19]

Schreiber

[11] Patent Number: 4,634,537
[45] Date of Patent: Jan. 6, 1987

[54] METHOD OF DEWATERING A SLUDGE SUSPENSION

[76] Inventor: Helmut Schreiber, D 5905 Bottenberg, Fed. Rep. of Germany

[21] Appl. No.: 338,154

[22] Filed: Jan. 8, 1982

Related U.S. Application Data

[63] Continuation of Ser. No. 173,278, Jul. 29, 1980, abandoned.

[30] Foreign Application Priority Data

Aug. 1, 1979 [DE] Fed. Rep. of Germany ... 7921970[U]

[51] Int. Cl.⁴ .............................................. B01D 33/10
[52] U.S. Cl. ..................................... 210/784; 210/798
[58] Field of Search ............... 210/369, 380, 381, 391, 210/393, 394, 403, 784, 798; 209/270, 288, 289, 290, 380; 127/56

[56] References Cited

U.S. PATENT DOCUMENTS

| | | | |
|---|---|---|---|
| 2,295,937 | 9/1942 | Crane et al. | 210/403 X |
| 2,367,961 | 1/1945 | Piponius | 210/369 X |
| 2,798,609 | 7/1957 | Smith et al. | 210/770 |
| 3,117,927 | 1/1964 | Smith | 210/326 |
| 3,193,927 | 7/1965 | Ubbels et al. | 210/403 X |
| 3,273,494 | 9/1966 | Cocchiarella | 100/121 |
| 3,491,885 | 1/1970 | Hazard | 210/391 X |
| 3,532,276 | 10/1970 | Dunn | 209/289 |

FOREIGN PATENT DOCUMENTS

| | | | |
|---|---|---|---|
| 572607 | 3/1933 | Fed. Rep. of Germany | 210/369 |
| 286855 | 3/1928 | United Kingdom | 210/369 |

Primary Examiner—David Sadowski
Attorney, Agent, or Firm—Roberts, Spiecens & Cohen

[57] ABSTRACT

A method for dewatering suspensions, in particular communal sewage sludges, in an apparatus comprising a cylindrical filter drum which can be rotated about an axis, a discharge outlet at the opposite end from a feeding inlet and, if desired, in its interior baffles, for example, ring-shaped wier-like obstructions. A conical filter drum which tapers towards the outlet end is fitted to the cylindrical filter drum forming an outlet part. The axis of the drum assembly can be inclined such that the lower contour of the conical outlet part is horizontal or at an acute angle of up to 15° above and/or below the horizontal.

7 Claims, 2 Drawing Figures

METHOD OF DEWATERING A SLUDGE SUSPENSION

This is a continuation of application Ser. No. 173,278, filed July 29, 1980, abandoned.

BACKGROUND OF THE INVENTION

1. Field of the Invention

The present invention relates to a method for dewatering suspensions, in particular communal sewage sludge in a cylindrical filter drum which can be rotated about an axis, having discharge means at the opposite end from the feeding inlet and, if desired, in its interior baffles, for example, ring-shaped wier-like obstructions.

2. Prior Art

Such filter drums with a horizontal axis are well known, the peripheral speed of which is the same over the entire length. The filter drum is required to offer a continually large fresh filter surface to the usually very watery suspension; for this reason a relatively high peripheral speed at a certain diameter is employed. With progressive dewatering which proceeds along with the transportation of the suspension to be dewatered in the direction towards the outlet end of the filter drum, the volume of the suspension decreases markedly, its consistency increases and a sludge cake, which rolls around in the lower region of the filter drum, is formed. This sludge cake releases relatively little water and therefore only a small fresh filter surface needs to be made available for it. With cylindrical filter drums, however, the same high peripheral speed of the inlet zone is also experienced at the outlet zone. This means that the sludge cake is subjected to high mechanical stresses, which leads to a breaking up of the desired, very sensitive flakes.

SUMMARY OF THE INVENTION

In view of this it is an object of the invention to provide a method using a filter drum such that sludge cake formation takes place in a favorable manner without giving rise to the above mentioned difficulties.

This object is achieved by the invention in that an outlet part which tapers conically towards the outlet end is fitted coaxially to the cylindrical filter or sieve drum, so that the peripheral speed is reduced in proportion to the reduction in diameter. With increasing dewatering the sludge cake formed is then subjected to lower stresses due to the lower circumferential speed which results in a corresponding reduction in the amount of damage done to the flakes. Hence, in the cylindrical filter a zone of relatively intense dewatering is provided whereas in the conical filter a zone of relatively gentle dewatering is provided.

It has been found particularly advantageous to arrange the inclination of the drum such that the lower contour of the conical outlet part is horizontal; this contributes to the gentle treatment of the sludge cake. For many types of sludge, however, it is advantageous to adopt an inclination of 15° to the horizontal. For this reason this axis of the drum can be altered within this range.

Of course it is also within the scope of the invention to employ drum axes which are at a fixed angle of inclination within this range.

According to the invention spray pipes are provided to clean the filter in particular at the cylindrical part of the device, the nozzles of which spray pipes produce preferably conical shaped sprays with the outer contour of the spray cone inclined at an angle of about 20° to the vertical of the drum exterior.

By using a filter drum of this type, significantly better dewatering is achieved than was possible with the relatively simply constructed filter drums which have been available up to now.

Further advantages, features and details of the invention will become evident from the following description of a preferred embodiment, with reference to the attached drawing.

DETAILED DESCRIPTION

Figure 1:
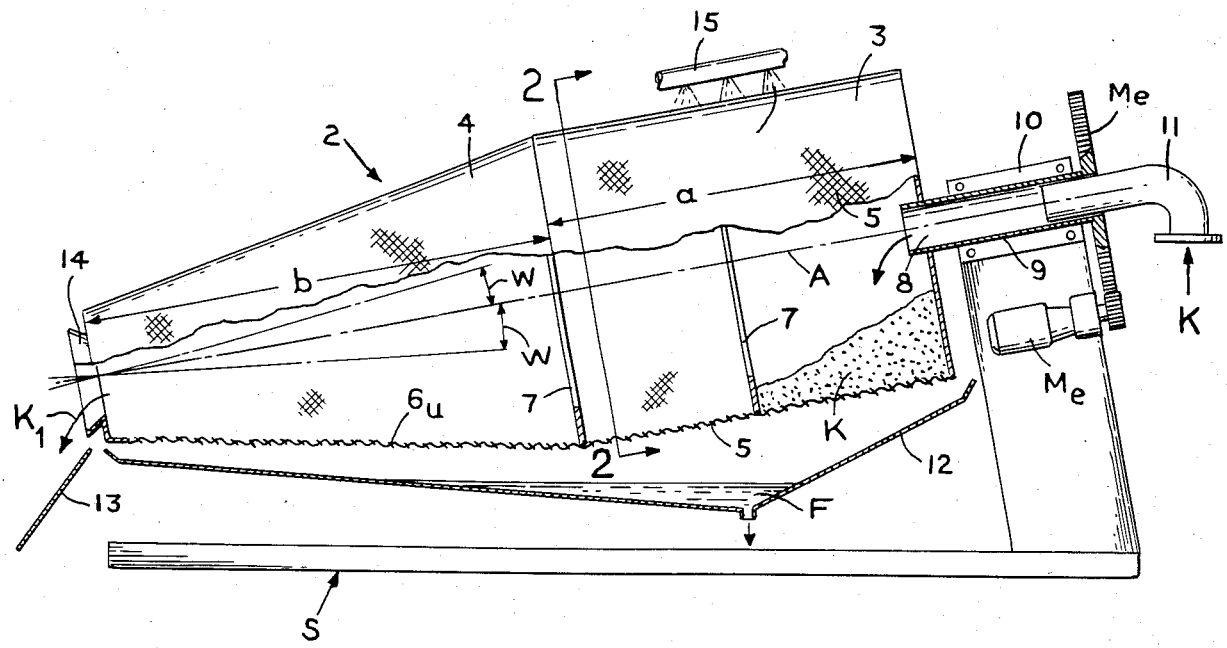
FIG. 1 is a front view of a partly broken away and sectioned sieve drum which carries out the method according to the invention.
Figure 2:
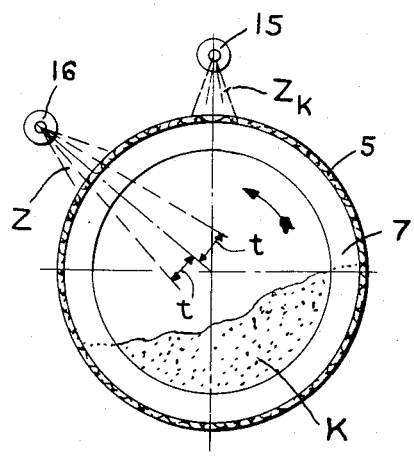
FIG. 2 is a cross section taken on line II—II in FIG. 1.

Mounted on a base plate 1 by bearings (not shown) is a filter or sieve drum 2, which can be rotated about its axis A by a drive unit Me, and which comprises a cylindrical part 3 of length a and a conical part 4 of length b. The outer wall or covering 5 of parts 3 and 4 is made of a filter cloth.

The lower contour $6u$ of the filter cloth in the conical part 4 extends parallel to the horizontal, supporting floor S; the axis A of the drum 2 can however be tilted upwardly and downwardly by an angle w of about 15° in the vertical direction, which in turn leads to a corresponding change in inclination of the lower contour $6u$.

Provided in the cylindrical part 3 of the drum 2 are ring shaped barriers 7 which act as baffles to promote better mixing of a sludge K entering the drum 2 at 8 from an inlet pipe 9, which is mounted on the bearings 10, via a pipe 11.

The filtrate F is collected in a tank 12, while the substantially dewatered sludge K, forms a sludge cake in the conical part 4 which is then removed via a chute 13 at a conical head 14 at the outlet of conical part 4.

The rotating filter drum 2 is cleaned by a liquid Z which is directed onto the filter cloth by spray pipes 15,16. The conical jets $Z_k$ from the nozzles of the spray pipes 15,16 strike the filter cloth vertically or at an angle t of up to 20°.

What is claimed is:

1. A method of dewatering a sludge suspension to produce a sludge cake, said method comprising introducing a suspension of sludge solids in a liquid into the inlet end of a sieve drum having a perforated wall, separating liquid from the suspension by passage of the liquid through said perforated wall while rotating the drum about an axis of rotation to provide substantially uniform peripheral velocity conditions at the perforated wall of the drum to form a dewatered cake within the drum in a first zone of relatively intense dewatering, axially advancing the now formed cake in said first zone on the rotating wall of the drum which is inclined downwardly at an acute angle with respect to the horizontal, the angle and rotation of the drum being conditioned on the sludge suspension to achieve formation of said cake and the intense dewatering in said first zone, continuing the axial advance of said now formed cake on the wall of the drum in a second zone of relatively gentle dewatering while gradually reducing the peripheral velocity of the wall in said second zone to reduce stresses in said cake and consequent damage to the flakes of the cake, and discharging said cake from an outlet end of the sieve drum, said cake being advanced along a substantially horizontal path in said second zone in which the peripheral velocity is being gradually reduced in relation to said cake to further minimize damage to said cake.

2. A method as claimed in claim 1 comprising spraying a cleaning liquid substantially radially against the wall of the sieve drum.

3. A method as claimed in claim 2 wherein the spraying of the cleaning liquid against said wall is effected only in said first zone in a conical stream whose angle is confined between 20° on either side of a line perpendicular to the wall of said drum.

4. A method as claimed in claim 1 wherein said liquid sludge suspension is sewage sludge.

5. A method as claimed in claim 1 comprising obstructing the axial passage of said suspension by baffles in said region in which the suspension undergoes uniform peripheral velocity conditions.

6. A method as claimed in claim 1 wherein said first and second zones are of similar length.

7. A method as claimed in claim 1 wherein said suspension is introduced at said inlet coaxially into said drum.

* * * * *